(12) United States Patent
Hurley et al.

(10) Patent No.: US 6,883,031 B1
(45) Date of Patent: Apr. 19, 2005

(54) RUSH-DCS—AN ADAPTABLE HIGH PERFORMANCE INTERFACE FOR SERVICES

(75) Inventors: Michael Hurley, Pickerington, OH (US); James A. Parker, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 722 days.

(21) Appl. No.: 09/661,220

(22) Filed: Sep. 14, 2000

(51) Int. Cl.[7] ............................................. G06F 15/16
(52) U.S. Cl. .................. 709/227; 709/229; 709/240
(58) Field of Search ................. 709/238, 229, 709/240, 227, 217, 203, 219, 228; 710/240–44, 40, 107.25; 711/151

(56) References Cited

U.S. PATENT DOCUMENTS

| | | | | |
|---|---|---|---|---|
| 4,581,734 A | * | 4/1986 | Olson et al. | 370/412 |
| 5,491,800 A | * | 2/1996 | Goldsmith et al. | 709/221 |
| 6,035,301 A | * | 3/2000 | Siegel et al. | 707/102 |
| 6,115,744 A | * | 9/2000 | Robins et al. | 709/227 |
| 6,138,155 A | * | 10/2000 | Davis et al. | 709/224 |
| 6,141,679 A | * | 10/2000 | Schaefer et al. | 709/201 |
| 6,496,831 B1 | | 12/2002 | Baulier et al. | |
| 6,502,133 B1 | | 12/2002 | Baulier et al. | |
| 6,618,778 B1 | * | 9/2003 | MacCormack | 710/244 |
| 6,681,230 B1 | | 1/2004 | Blott et al. | |

OTHER PUBLICATIONS

B. Nichols, D. Buttlar and J. Proulx Farrell, *Pthreads Programming*, O'Reilly & Associates, Inc., Chapter 1, Chapter 2, Chapter 3 (pp. 64–79 and 84–89), Chapter 4 (pp. 110–115 and 128–143), Chapter 5 (pp. 163–176 and 183–191) (1996).

W. Richard Stevens, *UNIX Network Programming*, Prentice Hall, vol. 1, Chapters 1–7, Chapter 13 and Chapter 15 (1998).

Gerald D. Baulier, Stephen M. Blott, Henry F. Korth and Avi Silberschatz, "Sunrise: A Real–Time Event Processing System," *Bell Labs Technical Journal*, Jan.–Mar. 1998, pp. 3–18.

* cited by examiner

*Primary Examiner*—Marc D. Thompson

(57) ABSTRACT

The RUSH-DCS system provides a high performance, near real time data collection interface that can decipher, log, and route information for transaction processing. The interface supports dynamically loadable components for defining input data formats and transport mechanisms and protocols, which may be augmented and modified while running to minimize downtime. It supports multiple input types simultaneously, and is independent of the actual downstream services provided, allowing support for multiple, and scalable downstream services as needed by diverse applications. In addition, RUSH-DCS provides priority messaging, both uni- and bi-directional communication between clients and services, and the ability to route transactions to specific services.

33 Claims, 13 Drawing Sheets

ADMINSTRATION

MAPPER

DOWNSTREAM MANAGEMENT

RUSH-DCS—AN ADAPTABLE HIGH PERFORMANCE INTERFACE FOR SERVICES

BACKGROUND OF THE INVENTION

This invention is directed to a recoverable, universal, scalable, high-performance data collection system (RUSH-DCS). More particularly, the method and system of the present invention provides for collection of data transactions through an adaptive interface, recording of such transactions and forwarding of the transactions to a downstream process in an efficient manner.

While the invention is particularly directed to the art of transaction processing in communication networks, and will be thus described with specific reference thereto, it will be appreciated that the invention may have usefulness in other fields and applications. Moreover, exemplary environments for the invention include those associated with billing (such as pre-paid billing), fraud detection, banking, trading, and functions of local exchange carriers (LECs) and competing local exchange carriers (CLECs). However, the invention may be used in any system where transactions from a variety of different sources require processing.

By way of background, real-time transaction processing services require collection of transactions from various resources. In this regard, transactions can be streamed over a myriad of communication transports with an unlimited range of data formats. As such, service developers are burdened with the task of data collection that is beyond the featured offerings of the service. Developing a data collection interface requires additional resources and time resulting in costs and delays that reduce profit and/or competitiveness.

Services that tightly couple therein data collection features lose the ability to dynamically adapt to new interfaces. In this regard, an existing such service may need to support a new interface. To achieve this, the service must be modified, rebuilt, and reintroduced into the existing production system. Not only are resource costs encountered, a business may lose profit while the service is removed and reinstalled into the system.

Duplication is another factor introduced when data collection is tightly coupled with a service. A service may have to support more than one interface. For each interface, additional code must be written and supported. Duplication is also needed when the same interface supports more than one service such that each service must contain the same interface code. This can add complexity to the service interface and make maintenance a much more tedious task.

Features that add to the complexity of data collection are recovery, scaling, and high performance. Using sound and leading edge techniques is key to the development of these features so that a service, or services, become known as best-inclass operation.

The present invention contemplates a method and apparatus for processing transactions in communication networks that resolve the above-referenced difficulties and others.

SUMMARY OF THE INVENTION

RUSH-DCS provides a high performance, near real time data collection interface that can decipher, log, and route information for transaction processing. The interface supports dynamically loadable components for defining input data formats and transport mechanisms and protocols, which may be augmented and modified while running to minimize downtime.

In one aspect of the invention, an apparatus for control of a transaction flowing from a client process to a downstream process is provided, the apparatus comprising a client server configured to recognize a connection request from the client process, a client channel for input of said transaction from the client process, a client interface generated by said client server for accepting said transaction from the client channel upon detection of a connection request, an input handler operative to direct the flow of the transactions, a plurality of priority queues operative to store the transaction, a mapper operative to serialize, log and route the transaction from the priority queues, a downstream server which generates a downstream interface, said transaction being routed by the mapper to the downstream interface, and said downstream server configured to coordinate connection requests and downstream process backflow messages.

In another aspect of the invention, a method for controlling a transaction flowing from a client process to a downstream process is provided, the method comprising the steps of detecting a connection request, associated with the transaction, by a client server, inputting said transaction from the client process into a client channel, said client server generating a client interface for said client channel upon detecting the connection request, assigning a priority to said transaction by an input handler, selectively loading the transaction from the client interface into a set of priority queues based on the priority assigned, serializing, logging and routing said transaction flowing from said priority queues by a mapper, communicating said transaction to an appropriate downstream process by the downstream interface, and coordinating connection requests and downstream process backflow messages by said downstream server.

In another aspect of the invention, an adaptive interface apparatus which performs programmed function operations for routing transactions in a data collection system is provided, the apparatus comprising a client server operative to search for and establish connections to a client process, a client interface generated by said client server upon detecting a connection request operative to establish a connection for the transfer of transactions, a communication interface operative to detect a connection request, communicate with the client server, route said transactions to and from the client process, and communicate with the client interface to fetch and send data over a client channel, and an input handler operative to direct the flow of the transactions and communicate with the communication interface and the client interface.

A primary advantage of the present invention is that it supports multiple input types simultaneously through the adaptive interface, and is independent of the actual downstream services provided, allowing support for multiple and scalable downstream services as needed by diverse applications. In addition, RUSH-DCS provides priority messaging, both uni- and bidirectional communication between clients and services, and the ability to route transactions to specific services.

Another advantage of the present invention is that it provides a sophisticated replay mechanism and synchronization protocol with the downstream services in the case of process or machine failure, while maintaining transaction order, and preventing the loss of data. Uniquely, these features are provided without the overhead and performance bottlenecks of traditional distributed transactions.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device, and steps of the method, whereby the aspects, objects and/or advantages contemplated are attained as hereinafter more fully set forth, specifically pointed out in the claims, and illustrated in the accompanying drawings in which:

DETAILED DESCRIPTION OF THE INVENTION

Figure 1:
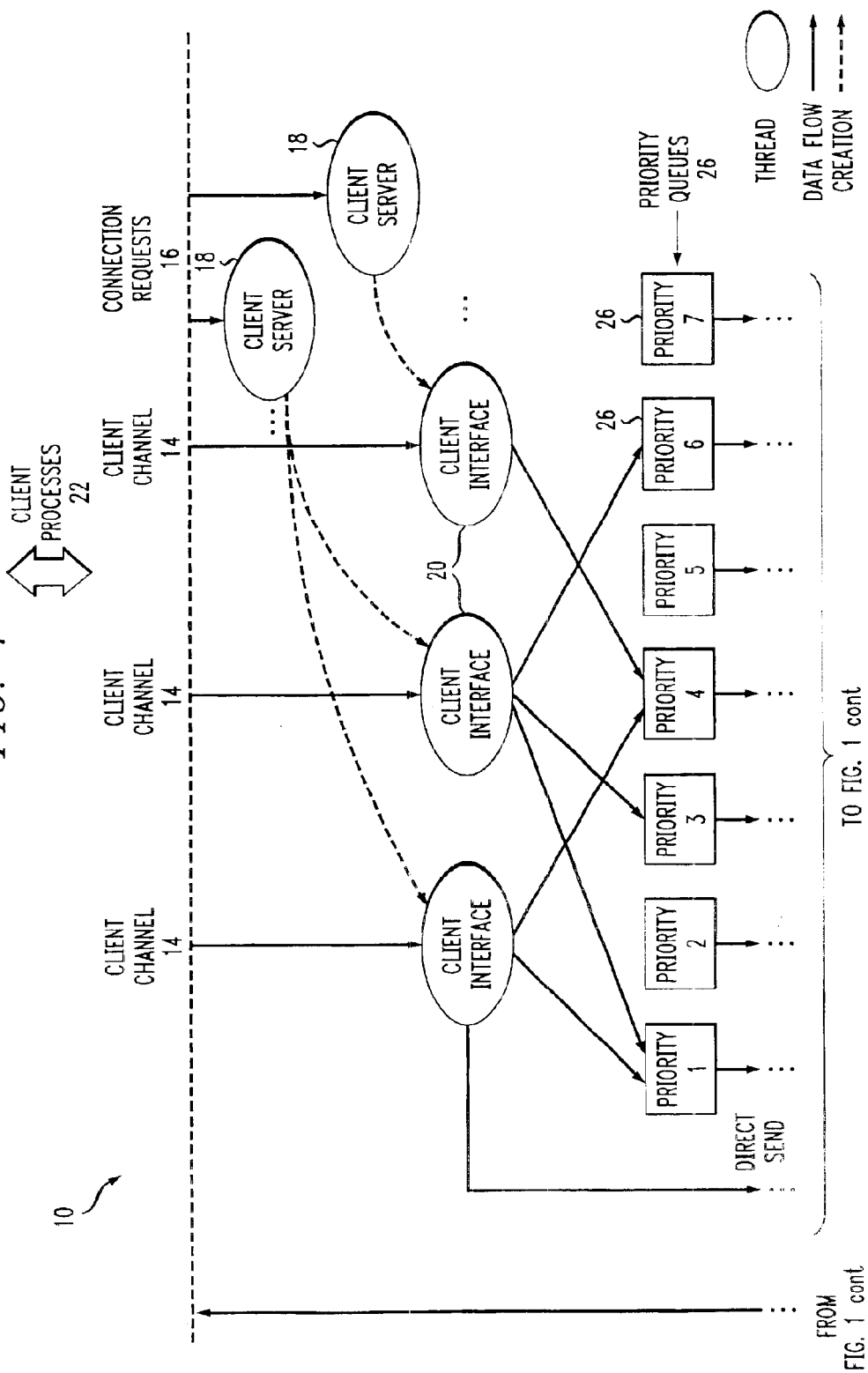
FIG. 1 is a block diagram showing the full architecture and general flow of the system of the present invention.
Figure 1:
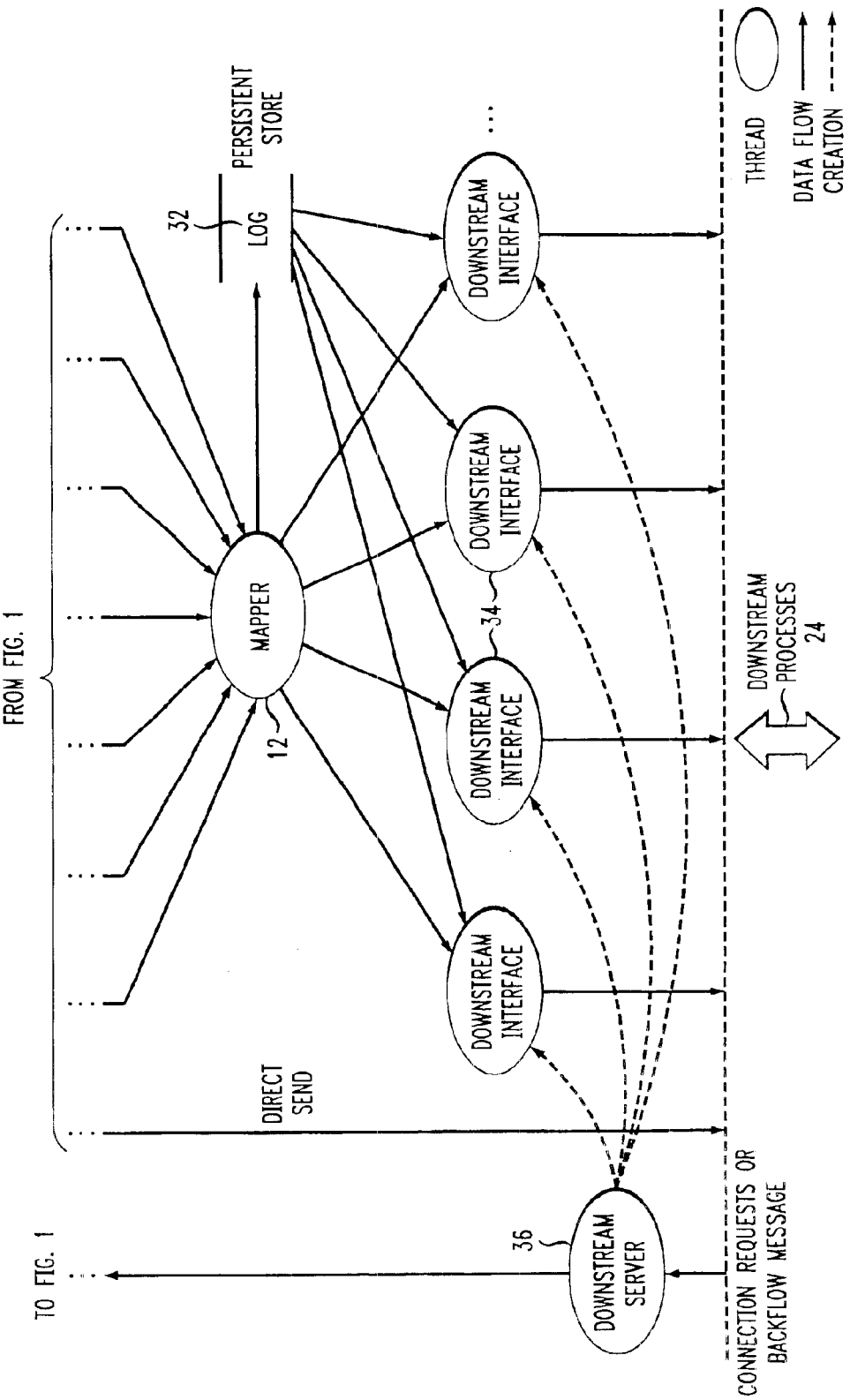

Referring now to the drawings wherein the showings are for purposes of illustrating the preferred embodiments of the invention only and not for purposes of limiting same, FIG. 1 is a block diagram illustrating the components and flow of a RUSH-DCS 10. Those skilled in the art will appreciate that this is a simplified view inasmuch as only one mapper 12 is shown and component management is left out.

As shown, transactions are sent into the RUSH-DCS 10 through a Client Channel 14. To establish the Client Channel 14, a Connection Request 16 must be directed through a designated Client Server 18. For each request, the Client Server 18 creates a Client Interface 20 that receives transactions from a requesting client. Once a transaction is received, the Client Interface 20 either sends the transaction directly to a targeted Downstream Process 24, or places it on an appropriate Priority Queue 26. Identifying the Downstream Process 24 and determining how to send a transaction are accomplished based on metadata contained in each transaction. This information is provided to the transaction by an Input Handler 28, illustrated in FIG. 2. The Input Handler 28 along with a Communication Interface 30 are used by the Client Server 18 and Client Interface 20 to detect Connection Requests 16 and transfer transactions to and from clients.

With further reference to FIG. 1, seven Priority Queues 26 are preferably provided. The Mapper 12 consumes transactions from the Priority Queues 26. The Mapper 12 serializes transactions, places them in a Log 32, and directs each transaction streaming to an appropriate targeted Downstream Process 24. It should be understood that keeping responsibility for tasks to a minimum in the Mapper 12 allows for more transactions to stream through the RUSH-DCS 10, resulting in improved performance. Hence, many of the responsibilities that could potentially be placed on the Mapper 12 are preferably passed on to the client and downstream interfaces, taking advantage of parallel processing, in the present invention.

The Mapper 12 places transactions on buffers (not shown in FIG. 1) associated with each Downstream Interface 34. There is one Downstream Interface 34 for each Downstream Process 24 that connects to the RUSH-DCS 10. It should be recognized that the mapping function can be spread out over more than one Mapper 12, if needed, with each such mapper pulling transactions from an associated set of priority queues. This arrangement will provide improved performance in many circumstances; however, downstream recovery may be adversely affected because transaction serialization is segregated in such an arrangement.

The Downstream Server 36 creates each Downstream Interface 34. As with client connections, the Downstream Server 36 establishes a connection between the RUSH-DCS 10 and a Downstream Process 24 when a connection request is received. Each newly created Downstream Interface 34 uses the starting point furnished by the Downstream Process 24 to replay data transactions upon start up. Once replay is complete, the Downstream Interface 34 then consumes transactions from its associated buffer and sends those transactions to the connected Downstream Process 24.

There are times when a Downstream Process 24 must respond to a transaction query sent by a client through the RUSH-DCS 10. However, the Downstream Process 24 has no connection to the client. The RUSH-DCS 10 provides a back flow feature that accepts a response from a Downstream Process 24 and passes it to the appropriate client. This feature is implemented in the Downstream Server 36. Hence, the Downstream Server 36 deciphers each message coming in from a Downstream Process 24 and determines whether a new Downstream Interface 34 must be created, a message must be passed to a Client Process 22, or the Downstream Process 24 must be disconnected.

To maintain performance, the memory allocation and unallocation of transactions is preferably minimized. Memory is allocated upon a transaction first arriving into the RUSH-DCS 10, and is unallocated after sending it to a Downstream Process 24. When a transaction is moved from one subsystem to another, only a pointer is passed. Hence all internal queues and buffers are actually lists of pointers to transactions.

Client Management

Figure 2:
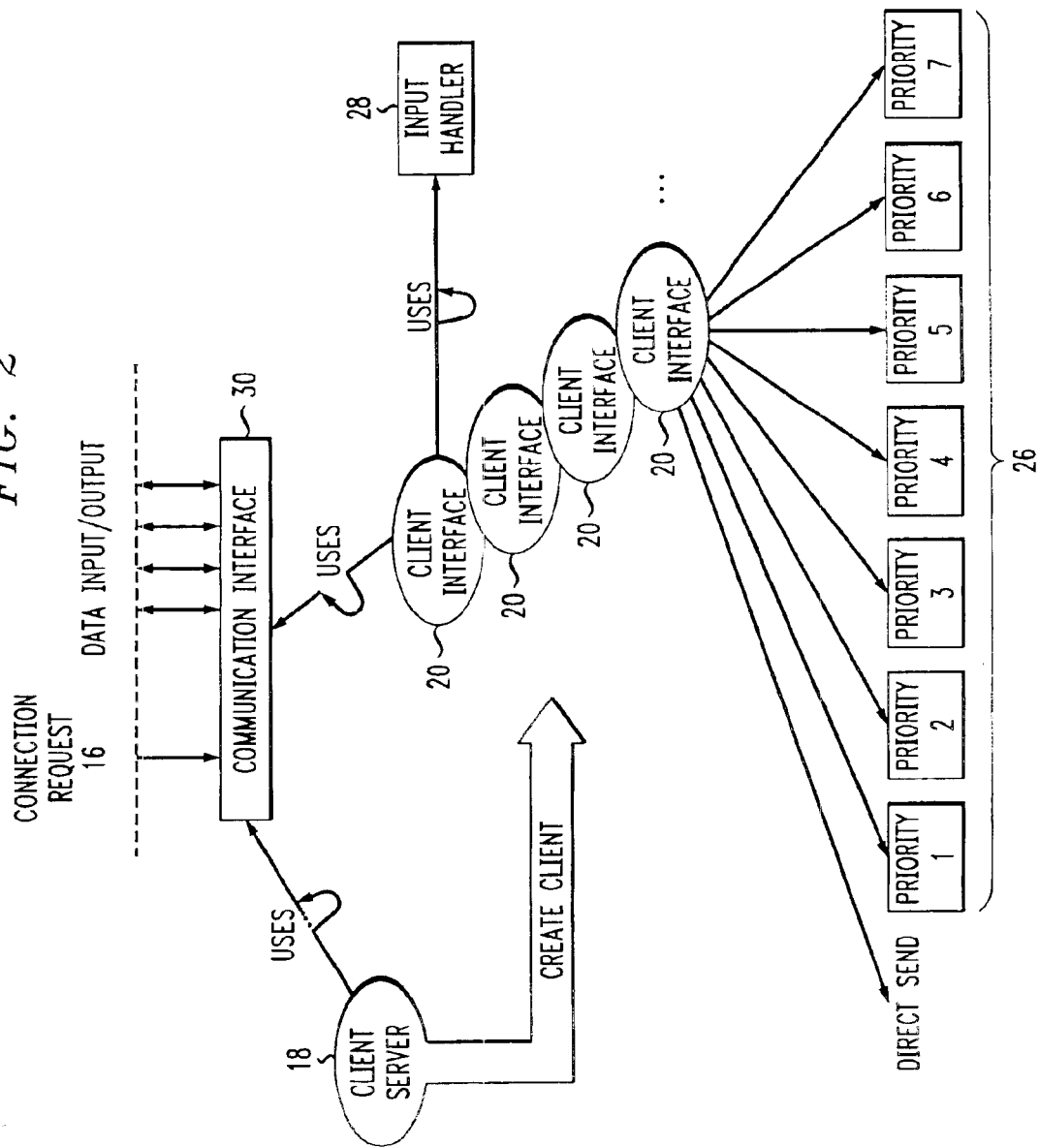
FIG. 2 is a block diagram showing how clients are managed using a client-server thread model and application developed components.

With reference to FIG. 2, the relationship between the Client Server 18 and Client Interface 20 is illustrated. A client may reside on the same machine as the RUSH-DCS 10 or on a different machine that is co-located on a LAN or a WAN. Normally, a client is part of the same application that is using the RUSH-DCS 10 and the framework upon which it is built.

The communication medium on which data is sent and received between the RUSH-DCS 10 and clients can vary. According to the present invention, one client may be communicating using the TCP/IP protocol while another is using a functional interface. The only restriction enforced by the RUSH-DCS 10 on clients is that they must abide by the client-server model. That is, a Client Server 18 must be directed to create a Client Interface 20 that is used to communicate with a client.

Communication between a Client Process 22, Client Server 18, and a Client Interface 20, is preferably channeled through the Communication Interface 30 and the Input Handler 28. These components provide application specific functions for communication, programmed functions, and data handling as the transaction streams through the system. Although the functions are application specific, each function signature is predefined so that there are established protocols. This provides the ability to adapt the RUSH-DCS 10 to virtually any interface in which clients may communicate. This is an important asset that allows the RUSH-DCS 10 to be used as an interface between existing systems and/or services.

In the RUSH-DCS 10, a "component" refers to a dynamically linked, or shared, library. There are three types of components supported.

1.) Input Handlers 28 that operate to read a specific type of transaction from a Client Channel 14, and set the metadata of a transaction.
2.) Communication Interfaces 30 that support specific communication protocols, e.g. TCP, UDP, IP, SNMP, IIOP, or functional. This allows the RUSH-DCS 10 to adapt to any type of communication transport that a client may be using.
3.) Client Services that contain one or more functions that are called from a Client Interface 20. Basically, a client service performs some type of operation that is user defined. It may add or update information in a transaction or send specific information back to a client.

RUSH-DCS 10 makes no assumptions about the integrity of a component. Ensuring that the Input Handler 28 knows how to read the data from the Client Channel 14, and what to do when data is invalid, is preferably the responsibility of the component developer. If there is something wrong with the data being streamed, the Input Handler 28 can direct the associated Client Interface 20 to stop reading transactions from the Client Channel 14. The same basic assumptions can be made about the Communication Interface 30, where the RUSH-DCS 10 maintains no knowledge of the protocol used to communicate. Allowing interface functions to be defined in components, rather than hard coded in the main process, adds flexibility when adapting to an existing interface.

Each Client Interface 20 is spawned as a separate thread from the Client Server 18, when a connection request 16 is received. Upon startup, each Client Interface 20 continuously cycles, e.g., looking for and reading transactions from the Client Channel 14. Part of creating the Client Interface 20 is setting up a reference to the associated Input Handler 28, and another to the Communication Interface 30. This is accomplished by passing pointers to the Client Interface 20. These pointers are used to call the functions needed for fetching transactions from the client. If there is no Input Handler 28, then there is no Client Server 18, which means there is no way for a client to connect to the RUSH-DCS 10. This ensures that every Client Interface 20 created does have access to an Input Handler 28, and a Communication Interface 30.

Preferably, there is separation of roles and responsibilities between the Communication Interface 30 and the Input Handler 28. The Communication Interface serves at a very low level for establishing links, along with fetching and sending data, while the Input Handler understands the semantics of the data and knows how to form this data into transactions. This separation extends reuse of components and provides flexibility. Hence, the same Communication Interface 30 can be used with more than one Input Handler 28.

There is a tight relationship between the Communication Interface 30 and the Input Handler 28. The Communication Interface 30 provides the functions needed to send and receive data while the Input Handler 28 instructs how and when data is fetched. Driving the entire data collection process are the Client Server 18 and Client Interface 20 threads that use these components.

Figure 3:
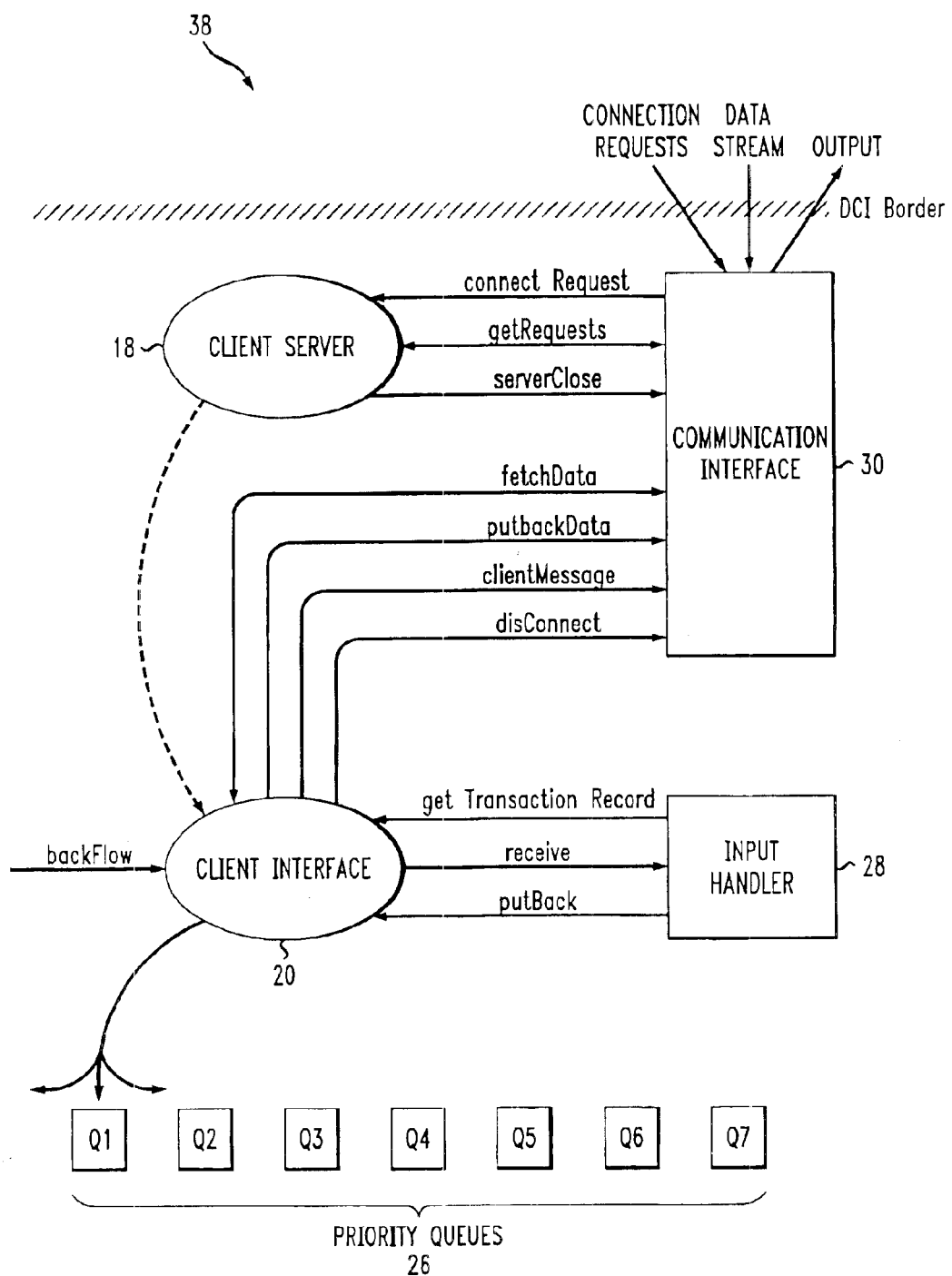
FIG. 3 is a block diagram showing the messages passing between threads and components of the "Adaptive Interface" of FIG. 1.

With reference to FIG. 3, the interaction between the components, the Client Server 18, and the Client Interface 20 threads is illustrated. All functions shown in this diagram comprise an Adaptive Interface 38, and preferably exist in the Communication Interface 30 and Input Handler 28 components. The Client Server 18 and Client Interface 20 access these functions through predefined abstractions. The abstractions define the function signatures allowing the Client Server 18 and Client Interface 20 to call Communication Interface 30 and Input Handler 28 functions without knowledge of implementation. Passed as a parameter of the transaction is a reference to the Client Server 18 or the Client Interface 20. This allows call backs into the Client Server 18 and Client Interface 20 for establishing bi-directional connectivity and passing data.

Upon startup, the Client Server 18 calls getRequests in the Communication Interface 30. This starts the sequence of getting Connection Requests 16, and establishing connections. To establish a connection, a call back to the Client Server 18 is made. As a result, the Client Server 18 spawns a new Client Interface 20 thread, which immediately establishes a connection to the client and begins the process of fetching transactions.

The function used by the Client Interface 20 to fetch transactions is getTransactionRecord in the Input Handler 28. This application provided function translates incoming data into transactions. To actually read data, getTransactionRecord makes a call back into the Client Interface 20. The Client Interface 20 then calls the fetchData function in the communication interface 30 with instructions on how much data to fetch. After fetching the amount of data requested, the fetchData function indirectly returns the data to getTransactionRecord which formulates and passes the transaction back to the Client Interface 20.

Each transaction received by the RUSH-DCS 10 is packaged into a TransactionRecord. TransactionRecord is a class of data that contains members needed to store all metadata contained in a transaction, plus a pointer to the transaction data as received from the Client Channel 14. The RUSH-DCS 10 requires certain metadata for each transaction. This metadata consists of priority, client tag, Client Interface handle, type, and cluster identifier.

Priority dictates how and when a transaction should be handled, and is set by the Input Handler 28. This information provides control over latency and throughput of transactions by determining in which queue to place each transaction. In addition, transactions may be sent directly to a downstream process when logging and serialization is not needed. Normally, these transactions are queries coming from some interactive session(s). Such transactions must have no bearing on the state of the system.

A Client Tag and Client Interface handle are set by the Client Interface 20 while processing a transaction received from the Input Handler 28. The client tag can either be a default value or a value sent by a client. Allowing the client to set this value provides a means for the client to request specific information from the RUSH-DCS 10 for a given transaction, or set of transactions.

The Client Interface handle is provided so that the Downstream Processes 24 can return the handle in a back flow message. This handle is then used by the Downstream Server 36 to determine which Client Interface 20 object to use for sending a back flow message to a targeted client.

The transaction type and cluster identifier are set by the Input Handler 28. The combination of these two parameters will determine to what Downstream Process 24 a transaction will be sent.

The type parameter may also indicate that a client service needs to be called in the Client Interface 20. In this case, the Client Interface 20 will call the client service identified in the transaction, and continue the process of fetching transactions once the service has returned control. The ability to call a service from the Client Interface 20 adds flexibility in the handling of data.

Mapping

Figure 4:
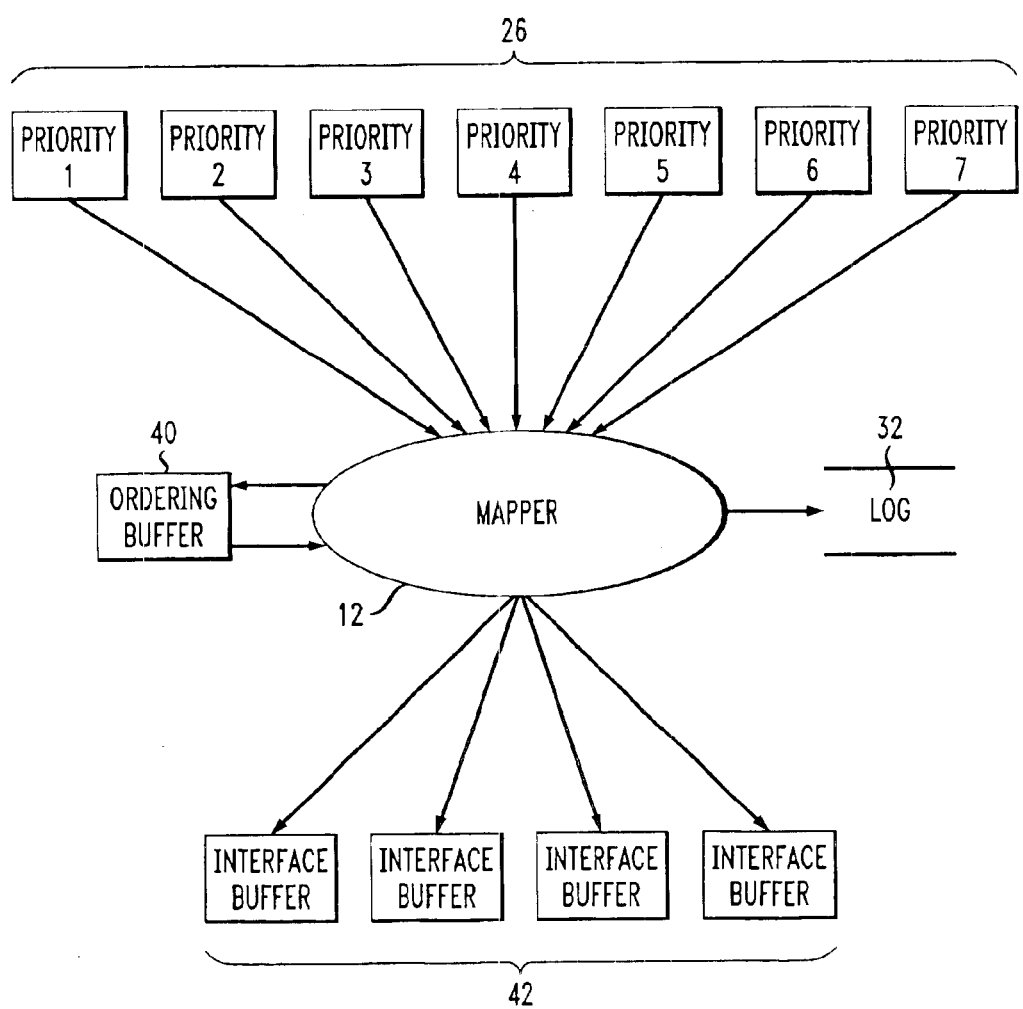
FIG. 4 is a block diagram of a mapper of FIG. 1.

With reference to FIG. 4, a simple view of the manner in which mapping is performed in the RUSH-DCS 10 is illustrated. The Mapper 12 is completely embedded in the RUSH-DCS 10. The responsibility of the Mapper 12 is to process all data arriving in the priority queues by serializing, logging, and routing transactions to downstream processes.

Figure 5:
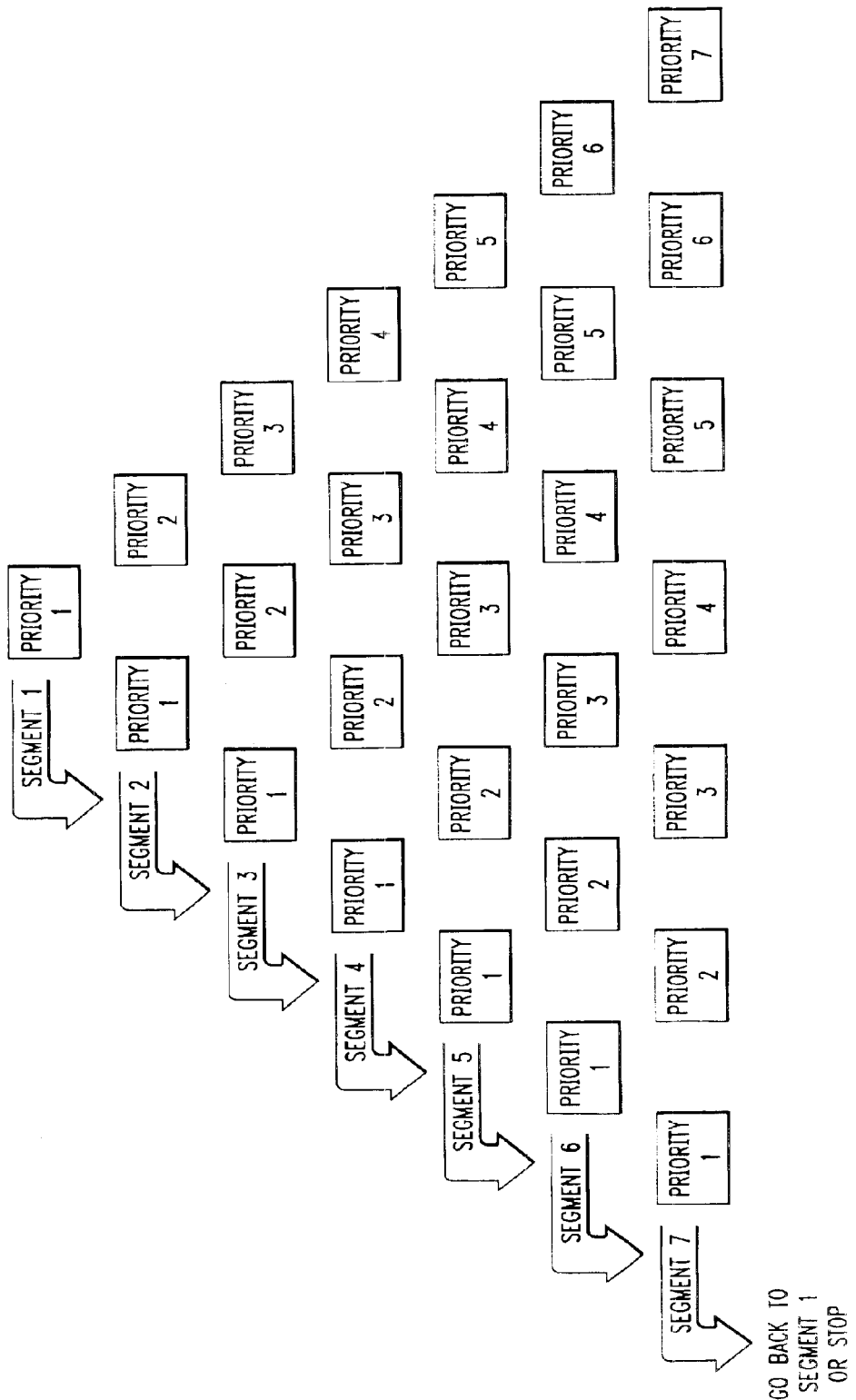
FIG. 5 is a flow diagram showing how priority queues are processed by the mapper of FIG. 1.

When there is no data streaming in, the Mapper 12 is blocked so that CPU cycles are conserved. Upon placing transaction data on a Priority Queue 26, the Client Interface 20 wakes the Mapper 12 by unblocking it. Blocking and unblocking of the Mapper 12 are implemented through a counting semaphore that is a member of the Mapper 12 but is accessible by any Client Interface 20. When all transactions are processed, the counting semaphore is reset to zero and the Mapper 12 is blocked until a Client Interface 20 wakes it again. This is one of the few situations where there is a need for coordination between threads in the RUSH-DCS 10. As discussed previously, priority queuing allows application developers to manipulate the throughput and/or latency of different types of transactions. Specifically, transactions with a smaller priority number are processed more rapidly than transactions with larger priority numbers. The Mapper 12 uses a special algorithm when consuming transactions from the Priority Queues 26. The algorithm is repetitive in nature. Basically, it starts with processing transactions on a Priority Queue 26, and works its way through the set of Priority Queues 26 by revisiting each smaller numbered queue before proceeding to the next. This algorithm is illustrated in FIG. 5.

As shown, transactions with the smallest priority number assigned will be processed sooner and more often then those with a larger priority number. This is accomplished by grouping Priority Queues 26 into segments where each segment contains all queues in the previous segment plus the next lowest Priority Queue 26.

As a general rule, transactions that require the lowest latency and need to be logged should be given a priority of one. A priority of one may also be given to transactions that require a high throughput; although, a priority of two may suffice if the priority one queue is limited to a small number of transactions. For transactions that are not as time dependent, a larger priority number should be assigned. The Mapper 12 will continue to process transactions, by repeating the sequence displayed in FIG. 5, until all Priority Queues 26 are emptied. It will then block, waiting on a Client Interface 20 to wake it when more transactions arrive.

The advantage of this queuing mechanism is that application developers have the leverage to control how and when transactions are processed without having to deal with intricate details. There is also the benefit of using a highly efficient queuing mechanism that allows high throughput and low latency. Also note that this queuing method guarantees that starvation will not occur. All transactions will be processed without excessive wait.

Transactions taken off of the priority queues are placed in a staging area known as the Ordering Buffer 40 where they are then processed sequentially. As each transaction is taken off of the Ordering Buffer 40 it is given a monotonically increasing serial number. This number is placed in the TransactionRecord and remains with the transaction throughout its existence.

Serial numbers are provided in transactions for recovery. When a Downstream Process 24 reconnects with the RUSH-DCS 10, it must pass a serial number. This serial number is then used to find the transaction in a Log 32, of the RUSH-DCS 10, and to replay all transactions starting with that number through to the end of the Log 32.

Figure 9:
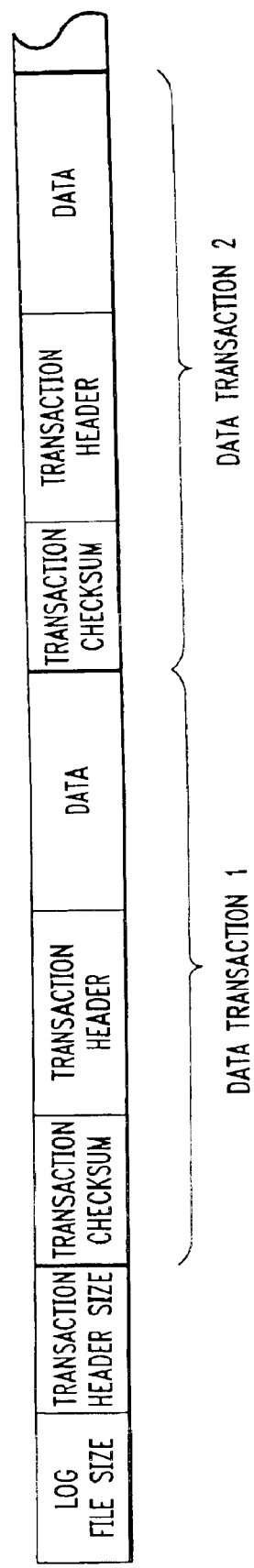
FIG. 9 is an illustration of the data format for a log file according to the present invention.

Another function of the Mapper 12 is logging. Transactions must be logged to a persistent store so that applications using the RUSH-DCS 10 can be returned to a consistent state when unplanned failure occurs. FIG. 9 illustrates the log format for the RUSH-DCS 10, log file.

Logging to a persistent store is a common performance bottleneck. There are a number of ways to perform logging that are safe. In the RUSH-DCS 10, logging is preferably performed using memory mapping. Upon creating a log file, the file is mapped to the RUSH-DCS 10 process. Transactions are written to this file one at a time, copying each transaction in four byte segments and aligned on a four byte boundary. This coincides with the length, and alignment, of most data types and allows for efficient copying without special case logic. Once a log file has reached its maximum size, which is definable, the file is unmapped and flushed to disk then a new file is created and mapped to the RUSH-DCS process. At this point the Mapper can begin logging transactions again.

Safety is embedded into the RUSH-DCS 10 Log 32 using checksums and sizes. Upon creating a log file, the file size and TransactionRecord size are stored in the first two (four byte) segments of the log file. These values are later checked when reading from the log file during replay. If the file size does not match the system registered 111e size, the log file has been corrupted. On the other hand, the TransactionRecord size indicates how many bytes each TransactionRecord takes up. If a new version of the RUSH-DCS 10 is installed, and the TransactionRecord has been modified, then transactions can still be accessed since the stored TransactionRecord size is used rather than the new size as long as changes to the TransactionRecord were made with backward compatibility in mind.

A checksum value is stored with each transaction logged. Each checksum is the "exclusive-or" of all segments in a transaction and is written immediately after the transaction and is stored in the segment preceding the transaction.

During replay, the checksum is read, the transaction is fetched, and a new checksum is calculated during the fetching of the transaction. If the new checksum does not match the stored checksum, then the transaction is corrupted. Upon detecting a corruption, the RUSH-DCS 10 records an error and stops replay. Replay must be stopped to ensure that data integrity downstream is not lost. Using a checksum ensures robustness at the finest granularity. If there is a corruption, then it is detected when comparing checksums.

The final responsibility placed on the Mapper 12 is to make sure that transactions are sent to the correct downstream process. Using the type and cluster identifier information in the TransactionRecord, the Mapper 12 routes each transaction to a proper Downstream Interface Buffer 42.

Mapper Support for Scalability

Figure 6A:
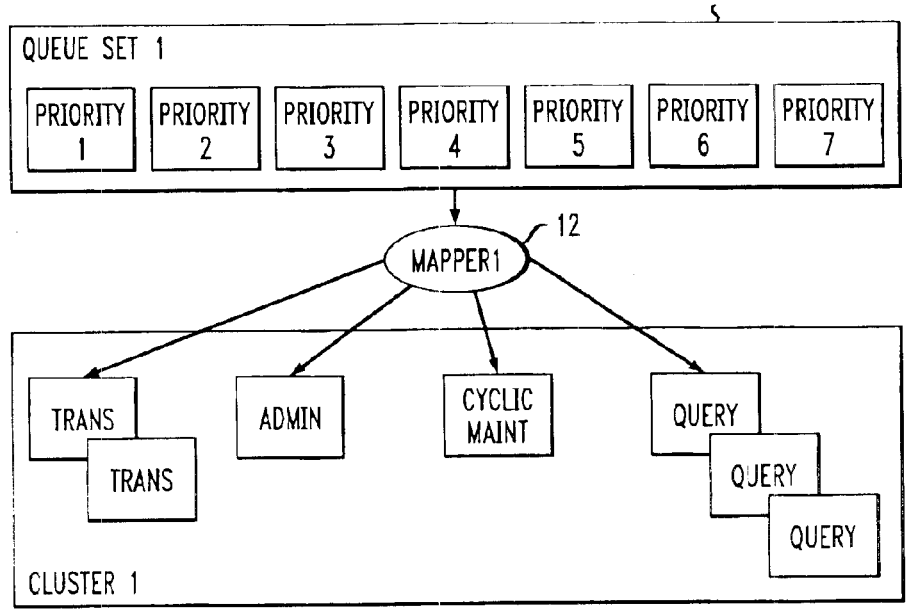
FIGS. 6(a) and (b) are block diagrams showing examples of how the present invention supports scaling.

Scalability is supported in a number of ways by the RUSH-DCS 10. Downstream Processes 24 can be grouped into sets that form clusters and multiple clusters can receive transactions from a single Mapper 12. In addition to multiple clusters, each cluster could contain multiple processes that handle the same type of service. Finally, the mapping function could be spread out over more than one Mapper 12. FIGS. 6(a) and (b) illustrate an example of how a system containing the RUSH-DCS 10 can be scaled.

Mapper 12 replication is needed when the data bandwidth of a single Mapper 12 is not great enough. To take advantage of this feature, the RUSH-DCS 10 must be configured with the number of Mappers 12 required, and the Input Handler 28 must be programmed to place transactions into the correct pool of Priority Queues 26 associated with each Mapper 12. This is accomplished using an additional parameter provided in the TransactionRecord metadata.

Having one set of Priority Queues 26 per Mapper 12 eliminates concurrency control between mappers and the chance of unnecessary blockage. The disadvantage of using multiple Mappers 12 is that each Mapper 12 generates its own set of serial numbers, which can affect cluster recovery. If cluster processes cannot be setup to handle more than one set of serial numbers then a cluster cannot accept transactions from more than one Mapper 12.

Sending transactions of the sane service type to multiple processes in the same cluster is illustrated in FIG. 6(a). The Mapper 12 must determine what iteration of a Downstream Process 24 to send a transaction. Rather than requiring this information in the transaction metadata, the Mapper 12 uses a round robin technique to spread the load evenly over all same service type processes in a cluster. This provides enhanced performance through parallel processing without segmenting data.

Figure 6B:
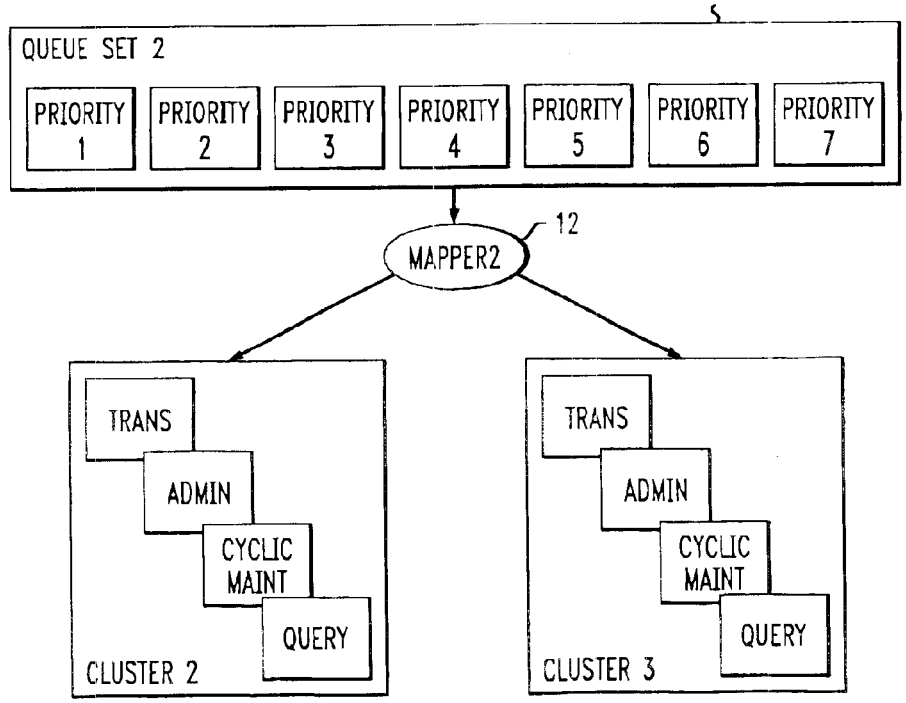

Multiple cluster scalability as illustrated in FIG. 6(b) is the most common of the scalability solutions. Here the Mapper 12 determines the cluster destination and the process within the cluster that must handle the transaction. The identities of the cluster and process are expected in the transaction metadata. Once the individual process is determined, the Mapper 12 places the transaction on the buffer of the associated Downstream Interface 34. Normally a multi-cluster solution is desirable if the data can be segmented over multiple data stores.

There is very little coupling between mapping and downstream management. The only coordination needed comes when a replay is requested. In this situation a small amount of concurrency control is needed to block the processing of transactions by the Mapper 12 while replay to a downstream service(s) is in progress. This concurrency control is added for the sake of downstream data integrity.

A transaction can be broadcast across a set of clusters in addition to being routed to a single cluster. Broadcast transactions are defined by the Input Handler 28. For each broadcast transaction the Mapper 12 will send the transaction to the targeted Downstream Process 24 in each cluster that is connected. Broadcast transactions are used to simultaneously update a set of data across all clusters. During replay, broadcast transactions are captured and sent to the targeted process without being sent to other Downstream Processes 24.

Downstream Management

Figure 7:
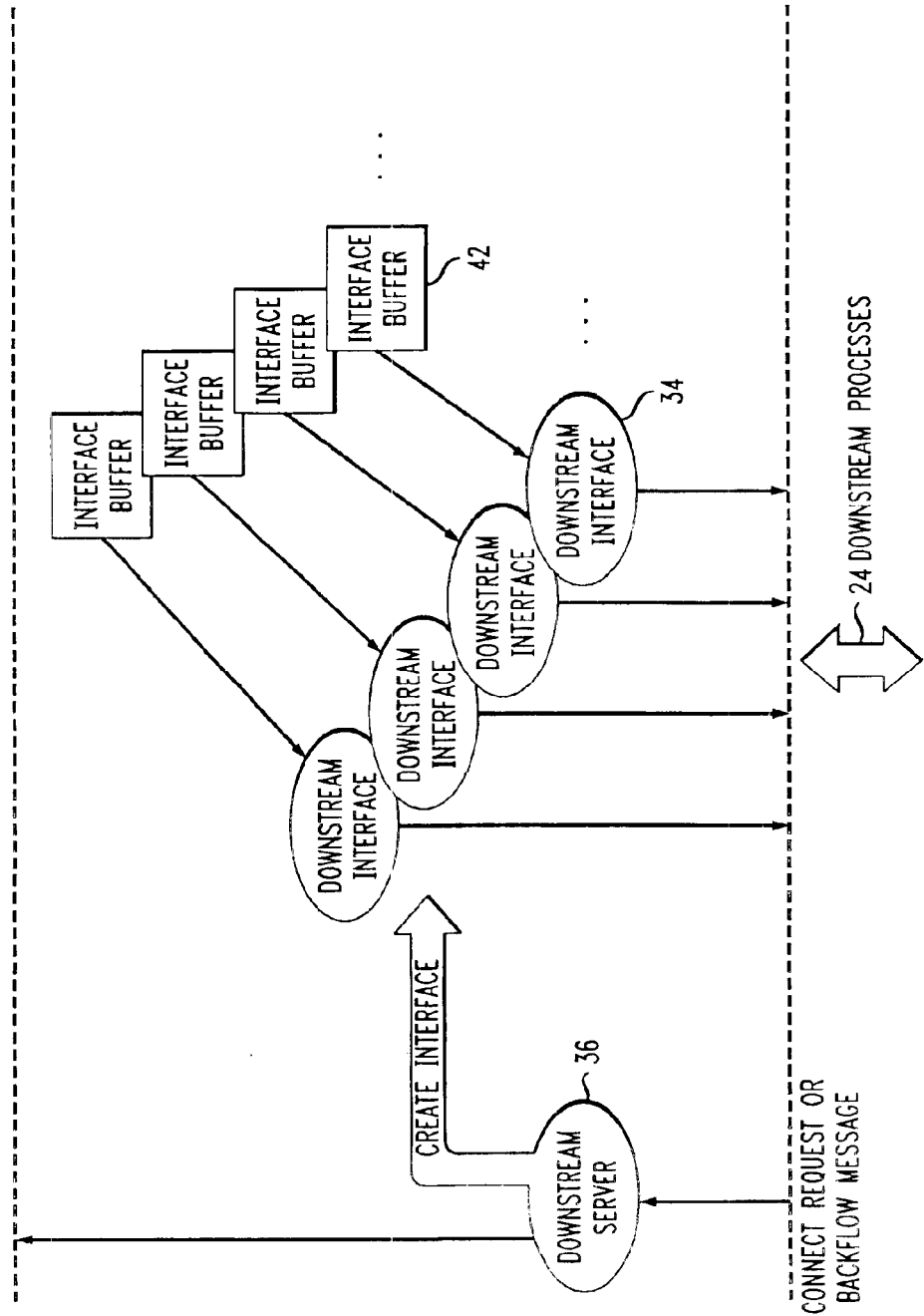
FIG. 7 is a block diagram showing the management of down stream process interfaces and the support for bi-directional data flow.

Downstream management is responsible for all interfaces to the Downstream Processes 24. It ensures that connections get established, replay is performed, and that transactions are routed to Downstream Processes 24. In addition, it accepts and routes back flow messages to the proper clients. FIG. 7 provides a view of Downstream Management in the RUSH-DCS 10.

Accepting all messages from Downstream Processes 24 is the Downstream Server 36. There is only one Downstream Server 36 needed for the entire RUSH-DCS 10 system. The Downstream Server 36 deciphers each message and determines what action must take place. One of three actions will occur. First, a new Downstream Interface 34 may be created. This results when a connection request is received. Second, the message received may be routed to a connected client. In this case, the Downstream Server 36 is acting as a router for some Downstream Process 24. The third, and final message, is a disconnection from the Downstream Process 24. This is actually a message received from the TCP/IP socket connected to the Downstream Process 24. It occurs automatically, meaning that there is no explicit action programmed into the Downstream Process 24 to send this message. Using the inherent disconnect feature in sockets rules out the problem of having dead, or never to be used again, Downstream Interface 34 instantiations. Note that Downstream Processes 24 are tightly coupled with TCP/IP. It is to be appreciated that this restraint may be alleviated by utilizing an adaptive interface to Downstream Processes 24 similar to what is provided in RUSH-DCS client management.

The Downstream Server 36 uses the Adaptive Interface 38 to send a back flow message to a client. It performs this task by calling the clientMsg function that has been defined in the Communication Interface 30 and is part of the associated Client Interface 20 object (FIG. 3). Lookup of the Client Interface 20 is very efficient since a handle to the Client Interface 20 is passed as part of the back flow message. If the Client Interface 20 does not exist, then the message is ignored and an error is reported. Otherwise, clientMsg is called and once control is returned, the Downstream Server 36 continues with the next task.

As discussed, the Downstream Server 36 creates a Downstream Interface 34 for each connection request received from a Downstream Process 24. If there is already a Downstream Interface 34 running for the requesting Downstream Process 24, then the request is ignored. After a connection is established, the Downstream Process 24 must provide the Downstream Interface 34 with a starting transaction serial number for replay. Replay will then be performed if needed. Once replay has completed, transactions will be consumed from the associated Downstream Interface buffer 42 and sent to the Downstream Process 24 on a continuous cycle. Using more than one Downstream Interface 34 is another feature of the RUSH-DCS 10 that provides for high performance. Transactions can be streamed to multiple Downstream Process 24 at the same time. In addition, more than one replay can occur at the same time starting from various places within the Log 32. This reduces the duration of a cluster or multicluster recovery.

Replaying transactions while establishing an interface to a Downstream Process 24 ensures that no data is lost. Of course, it is the responsibility of the Downstream Process 24 to furnish a serial number starting point. How a starting point is derived is not a concern of the RUSH-DCS 10. However, making sure that all transactions originally sent to the Downstream Process 24 from the starting point to the end of the Log 32, is the responsibility of the RUSH-DCS 10. The Downstream Interface 34 performs this task by finding the log file in which the starting transaction exists. It then memory maps that log file and proceeds to the starting transaction. At this point, each transaction in the Log 32 is fetched, and its destination is matched against the Downstream Process 24 identifier. If both transaction type and cluster identifier match the connected Downstream Process 24, then the transaction is sent. The process of fetching transactions from the Log 32 continues until the last transaction in the Log 32 has been retrieved. As mentioned previously, the checksum for each transaction is validated. If the transaction is corrupted, then replay is discontinued, and an error is reported.

Administration and Component Management

Figure 8:
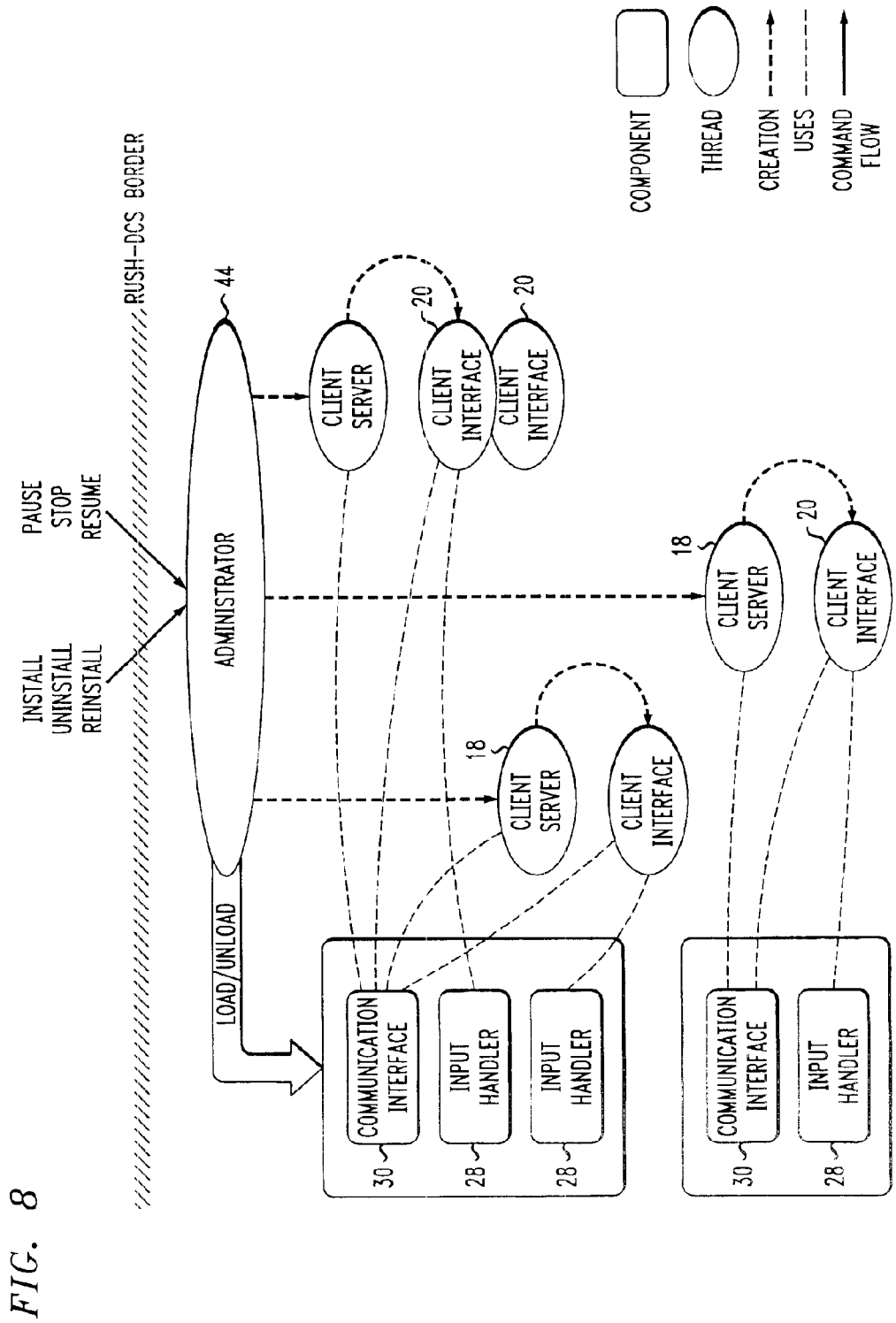
FIG. 8 is a block diagram showing the administration and usage of threads and components needed to handle data input.

Central to all administrative tasks is a process thread, known as the Administrator 44 (not to be confused with an administrative service). The responsibility of this thread is to manage components and Client Channels 14. It receives commands to load and unload components along with starting, stopping, and pausing Client Channel 14 data flow. FIG. 8 illustrates an example of the associations between components and threads, managed by the Administrator 44.

Again, with reference to FIG. 8, there can be multiple Input Handlers 28 per communication interface 30—meaning that the same communication transport can be used to send transactions in various formats. At the same time, multiple communication transports can be supported allowing clients to communicate over a myriad of communication interfaces 30.

The key contribution of the RUSH-DCS 10 component management is the ability to install, uninstall, or reinstall a component while in full run, real time mode. Contained in one thread, the Administrator 44 listens for component management commands throughout the life of the RUSH-DCS 10 process. When a component command is received, it is validated and the requested action is performed or an error is returned.

Installing a communication interface 30 component only requires loading a shared library. To install an Input Handler 28, the Administrator 44 must ensure that an expected communication interface 30 is available. Without the communication interface 30 loaded, there is no way for an Input Handler 28 to receive data, therefore, rather than blindly loading the Input Handler 28, an exception occurs. Once the Communication Interface 30 is validated, the Input Handler 28 component is loaded and a new Client Server 18 is spawned.

The Administrator 44 is fully aware of the dependencies on each component and ensures that components are safely uninstalled and reinstalled. It does this by either blocking data flow or shutting down one or more Client Channels 14. For example, when uninstalling an Input Handler 28 the associated Client Server 18 and all Client Interfaces 20 are deleted before the Input Handler 28 is unloaded. This eliminates data loss and segmentation errors.

General Handling of Transactions and Administration

Figure 10:
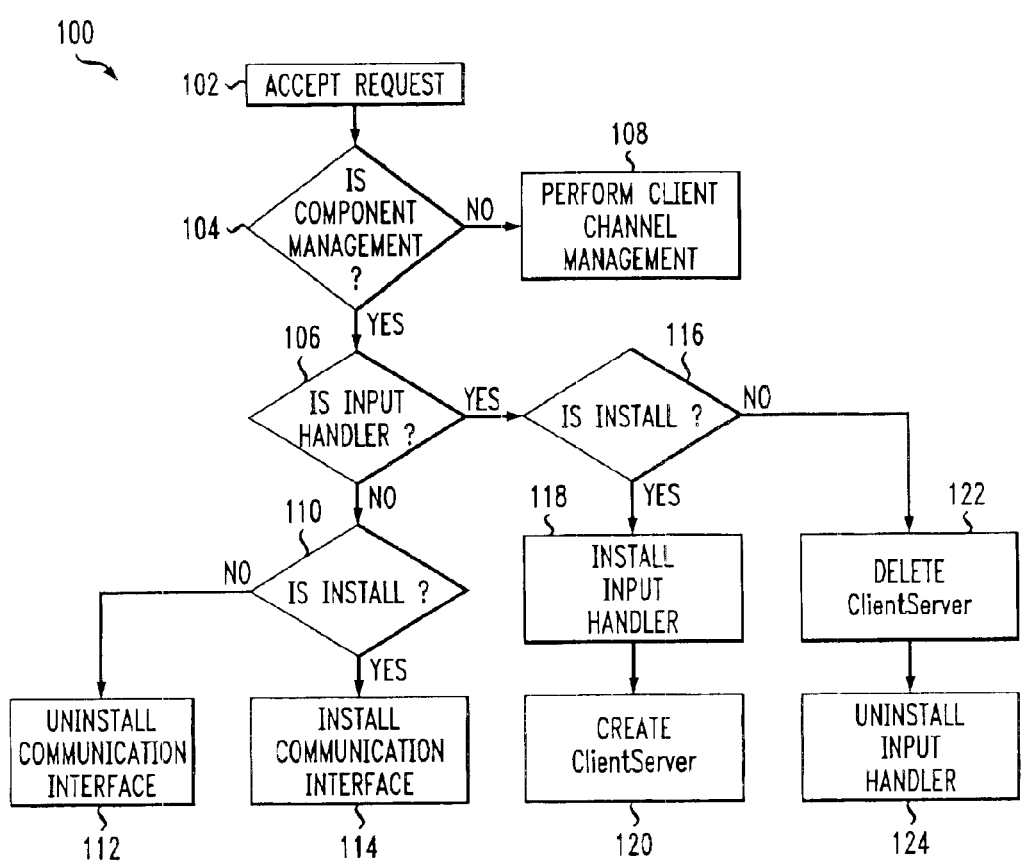
FIG. 10 is a flow chart diagram representing the handling of an administrative request.

Referring to FIG. 10, illustrated is the Administration flow chart diagram of a method 100 for controlling the application specific management of RUSH-DCS. As shown, the method is initiated by accepting a notification request, including a command (step 102). Next, a determination is made whether Component Management should be performed (step 104). If not, client channel management is performed (step 108). If component management is performed, a determination is then made whether the component to be managed is an Input Handler (step 106). If not, it is a Communication Interface component that is to be managed and a determination is made whether the interface should be installed (step 110). Then, either a Communication Interface is uninstalled (step 112) or installed (step 114). If step 106 results in a "yes" decision, the method will determine whether the Input Handler should be installed (step 116). If this step results in "yes" decision, the Input Handler is installed (step 118) and the Client Server is created (step 120). If step 116 results in a "no" decision, the Client Server is deleted (step 122), and the Input Handler is uninstalled (step 124).

Figure 11:
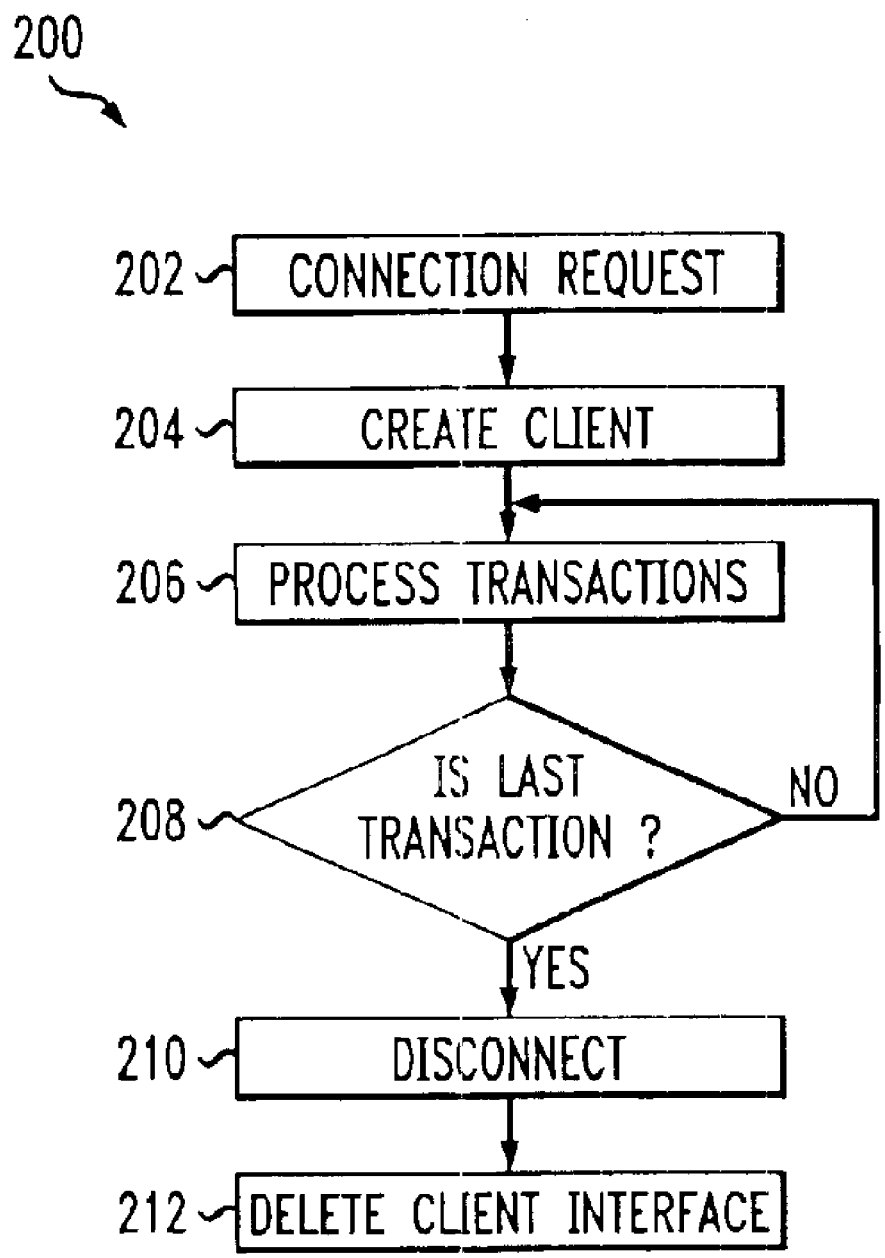
FIG. 11 is a flow chart diagram representing a process associated with the Adaptive Interface.

Referring now to FIG. 11, illustrated is the Adaptive Interface flow chart diagram of the method 200 which represents a single connection to a client channel and the processing of the incoming transactions. Upon a Connection Request (step 202), a client is created (step 204) and then transactions are processed (step 206). Next, a determination of whether a last transaction is performed is made (step 208). If not, the method returns to (step 206). If so, a disconnect occurs (step 210). Then, the client interface is deleted (step 212).

Figure 12:
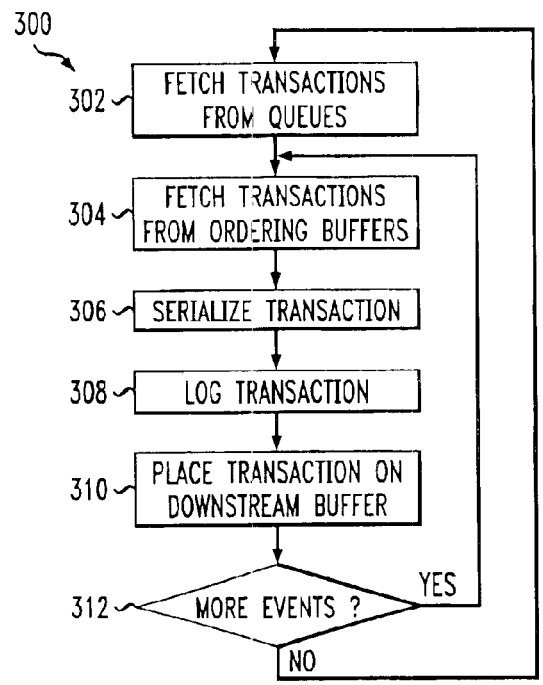
FIG. 12 is a flow chart diagram representing the mapping of a transaction to a downstream buffer.

Referring now to FIG. 12, illustrated is the Mapper flow chart diagram of the method 300 for the RUSH-DCS. As shown the method proceeds to the fetch transactions from queues (step 302). Once fetched, the method proceeds to the fetch transaction from the ordering buffer (step 304). Next, the transactions are serialized (step 306). Once serialized, the transaction is logged (step 308), and then the method proceeds to place the transaction(s) on an appropriate downstream buffer (step 310). Lastly, the Mapper 300 determines if more transactions (step 312) are to be fetched from either the queues (step 302), or from the ordering buffer (step 304).

Figure 13:
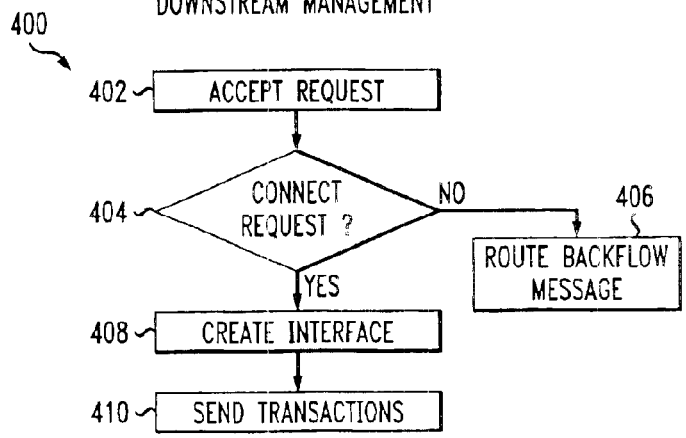
FIG. 13 is a flow chart diagram representing the Downstream Management process.

Referring now to FIG. 13, illustrated is the Downstream Management flow chart diagram of a preferred method 400. Upon receipt of an accept request (step 402), a determination is made as to whether a connect request is present (step 404). If not, the Downstream Management 400 will Route Backflow Message (step 406) back through the RUSH-DCS. If a connect request is present an interface is created (step 408), and the transaction will be transmitted (step 410).

The invention has been described with reference to the preferred embodiment. Obviously, modifications and alterations will occur to those skilled in the art upon a reading and understanding of this specification. The invention is intended to include all such modifications and alterations insofar as they come within the scope of the appended claims or equivalents thereof.

What is claimed is:

1. A method for controlling a transaction flowing from a client process to a downstream process, the method comprising the steps of:

detecting a connection request, associated with the transaction, by a client server;

inputting said transaction from the client process into a client channel, said client server generating a client interface for said client channel upon detecting the connection request;

assigning a priority to said transaction by an input handler;

selectively loading the transaction from the client interface into a set of priority queues based on the priority assigned;

serializing, logging and routing said transaction flowing from said priority queues by a mapper;

communicating said transaction to an appropriate downstream process by a downstream interface; and, coordinating connection requests and downstream process backflow messages by a downstream server.

2. The method as set forth in claim 1, further comprising the step of programming the input handler with metadata containing routing and identifying information to direct the transaction to a downstream process.

3. The method as set forth in claim 1, further comprising the step of detecting connection requests and transferring said transaction to and from said client processes.

4. The method as set forth in claim 1, further comprising the step of, at selected times, directly sending the transaction to the downstream process.

5. The method as set forth in claim 1, further comprising the step of adapting an interface for performing programmed functions among the client server, the client interface, and the input handler, for establishing bi-directional connectivity and passing data.

6. The method as set forth in claim 1, further comprising the step of creating a transaction-record to store all metadata of said transaction, including a pointer to each transaction.

7. The method as set forth in claim 1, further comprising the step of assigning a priority to the transaction by the input handler, such priority being used to control latency, throughput of transactions, and placement of the transaction into the priority queue.

8. The method as set forth in claim 1, further comprising the step of replicating an additional mapper.

9. The method as set forth in claim 1, further comprising the step of running a repetitive algorithm in the mapper which selects transactions from the set of priority queues by revisiting each smaller numbered queue before proceeding to the next smaller numbered queue.

10. The method as set forth in claim 1, further comprising the step of replaying said transaction, from the log, upon a system fault and/or a request of a downstream process.

11. The method as set forth in claim 1, further comprising the step of the downstream server routing a backflow massage for communicating with the client process.

12. The method as set forth in claim 1, further comprising the step of broadcasting said transaction to multiple downstream processes.

13. The method as set forth in claim 1, further comprising the step of generating additional interfaces, while the system is in a real time run mode.

14. An apparatus for control of a transaction flowing from a client process to a downstream process, the apparatus comprising:

a client server configured to recognize a connection request from the client process;

a client channel for input of said transaction from the client process;

a client interface generated by said client server for accepting said transaction from the client channel upon detection of a connection request;

an input handler operative to direct the flow of the transaction;

a plurality of priority queues operative to store the transaction;

a mapper operative to serialize, log and route the transaction from the priority queues;

a downstream server which generates a downstream interface, said transaction being routed by the mapper to the downstream interface; and, said downstream server configured to coordinate connection requests and downstream process backflow messages.

15. The apparatus according to claim 14, wherein each transaction contains metadata information, said metadata having routing and identification information to direct the transaction to a downstream process.

16. The apparatus according to claim 14, wherein a communication interface is used by the client server and the client interface, to detect connection requests and transfer said transaction to said client processes.

17. The apparatus according to claim 14, wherein at selected times, the client interface directly sends the transaction to the downstream process.

18. The apparatus according to claim 14, wherein an adaptive interface performs programmed function operations between the client server, the client interface, the communication interface and the input handler for establishing bi-directional connectivity and passing of said transaction.

19. The apparatus according to claim 14, wherein a transaction-record is created to store all metadata of said transaction and assigns a pointer to each transaction.

20. The apparatus according to claim 14, wherein a priority is assigned to each transaction by an input handler and is used to control latency, throughput of said transaction and placement of the transaction into the priority queue.

21. The apparatus according to claim 14, wherein at least one additional mapper is replicated when said transaction exceeds a bandwidth of the mapper.

22. The apparatus according to claim 14, wherein a repetitive algorithm processes the set of priority queues by revisiting each smaller numbered queue before proceeding to the next set.

23. The apparatus according to claim 14, wherein the downstream interface replays said transaction, from the log, upon a system fault and/or detection of corrupted data.

24. The apparatus according to claim 14, wherein the downstream server routes the backflow message for communicating with the client process.

25. The apparatus according to claim 14, wherein said transaction is broadcast to multiple downstream processes.

26. The apparatus according to claim 14, wherein additional interfaces are generated while the system is in a real time run mode.

27. An adaptive interface apparatus which performs programmed function operations for routing transactions in a data collection system, the apparatus comprising:

a client server operative to search for and establish connections to a client process;

a client interfaces generated by said client server upon detecting a connection request operative to establish a connection for the transfer of transactions;

a communication interface operative to detect a connection request, communicate with the client server, route said transactions to and from the client process and communicate with the client interface to fetch and send data over a client channel; and an input handler operative to direct the flow of the transactions and communicate with the communication interface and the client interface.

28. The apparatus according to claim 27, wherein said client interface continuously cycles, searches and reads transactions from a client channel.

29. The apparatus according to claim 27, wherein the communications interface operates at a low level and performs the functions of establishing links, retrieving data and sending data.

30. The apparatus according to claim 27, wherein pointers are assigned to the transactions and are passed to the functions needed for retrieving transactions from a client channel.

31. The apparatus according to claim 30, wherein said pointers are used as a reference between the input handler, the communications interface and the associated client interface.

32. The apparatus according to claim 31, wherein the input handler prioritizes the transactions and determines the sequence for routing the transactions.

33. The apparatus according to claim 31, wherein a new client interface is generated, in real time run mode, upon detecting a new connection request.

* * * * *